United States Patent
Niezabytowski et al.

(10) Patent No.: US 8,709,670 B2
(45) Date of Patent: Apr. 29, 2014

(54) FUEL CELL SYSTEM WITH MECHANICAL CHECK VALVE

(75) Inventors: Francis Niezabytowski, Rochester, MI (US); Fred G. Brighton, Ann Arbor, MI (US); Craig Michael Mathie, White Lake, MI (US); Douglas Piccard, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 726 days.

(21) Appl. No.: 12/831,639

(22) Filed: Jul. 7, 2010

(65) Prior Publication Data

US 2011/0165484 A1    Jul. 7, 2011

(51) Int. Cl.
*H01M 8/04*    (2006.01)
*B60K 1/00*    (2006.01)

(52) U.S. Cl.
USPC .................... 429/443; 429/428; 180/65.1

(58) Field of Classification Search
USPC ......... 429/415, 414, 437, 443, 444, 428, 429; 261/75, 94; 137/78.1; 180/65.1
See application file for complete search history.

(56) References Cited

U.S. PATENT DOCUMENTS

| | | | |
|---|---|---|---|
| 6,727,013 B2 | 4/2004 | Wheat et al. | |
| 6,916,571 B2 | 7/2005 | Grasso et al. | |
| 6,953,635 B2 | 10/2005 | Suzuki et al. | |
| 7,018,732 B2 | 3/2006 | Cargnelli et al. | |
| 2002/0039674 A1* | 4/2002 | Suzuki et al. | 429/30 |
| 2003/0194590 A1* | 10/2003 | Cargnelli et al. | 429/26 |
| 2005/0280166 A1* | 12/2005 | Katagiri et al. | 261/75 |
| 2006/0115693 A1 | 6/2006 | Toth et al. | |
| 2006/0147774 A1 | 7/2006 | Suzuki et al. | |
| 2009/0004516 A1 | 1/2009 | Bai et al. | |

OTHER PUBLICATIONS

A. Pesaran et al., PEM Fuel Cell Freeze and Rapid Startup Investigation, National Renewable Energy Laboratory Milestone Report, NREL/MP-540-38760, Sep. 2005.
M. Ogburn, Systems Integration, Modeling, and Validation of a Fuel Cell Hybrid Electric Vehicle, Thesis submitted to the Faculty of Virginia Polytechnic Institute and State University in partial fulfillment of the requirements for the degree of Master of Science in Mechanical Engineering, May 4, 2000.

* cited by examiner

*Primary Examiner* — Kenneth Douyette
(74) *Attorney, Agent, or Firm* — Damian Porcari; Brooks Kushman P.C.

(57) ABSTRACT

A fuel cell system may include a cathode loop having an operating pressure during fuel cell system operation. The cathode loop may include a normally open mechanical check valve disposed at a water pooling location within the loop and having a cracking pressure approximately equal to the operating pressure.

14 Claims, 2 Drawing Sheets

FUEL CELL SYSTEM WITH MECHANICAL CHECK VALVE

BACKGROUND

Fuel cell systems are increasingly being used as power sources in a wide variety of applications. Fuel cell systems, for example, may be used as replacements for vehicle internal combustion engines (ICE).

A proton exchange membrane (PEM) fuel cell includes a membrane electrode assembly (MEA) that is sandwiched between conductive anode and cathode plates. This membrane functions as a proton conductive electrolyte membrane in a water containing state. In a dry state, however, its proton conductivity decreases, thus causing a decrease in power output. Therefore, a fuel cell system equipped with this type of fuel cell is often designed to humidify reaction gases (anode gas and cathode gas) supplied to an anode and cathode of the fuel cell by a humidifier so that the membrane can maintain proper humidity.

To produce electricity through an electrochemical reaction, hydrogen ($H_2$) is supplied to the anode and oxygen ($O_2$) is supplied to the cathode (via air). In a first half-cell reaction, dissociation of the hydrogen $H_2$ at the anode generates hydrogen protons $H^+$ and electrons $e^-$. The membrane is proton conductive and dielectric. As a result, the protons are transported through the membrane while the electrons flow through an electrical load that is connected across the membrane. In a second half-cell reaction, oxygen $O_2$ at the cathode reacts with protons $H^+$, and electrons $e^-$ are taken up to form water $H_2O$.

Because fuel cells have become viable for widespread commercial use, cold weather performance characteristics of fuel cells have become more important. The ambient temperature tolerance specification for certain vehicles, for example, typically includes temperatures between −40° C. to 52° C. Liquid and vapor water within the fuel cell system, however, may present issues for cold weather operation of the fuel cell. The fuel cell stack humidification systems and water generation at the cathode during operation generally ensure that water in a liquid or vapor state will exist in almost all parts of the fuel cell stack during dwell times. At one atmosphere and temperatures below 0° C., water freezes and may block the flow passages of the fuel cell stack and the fuel cell system balance of plant. These blockages may hinder fuel cell system operation.

SUMMARY

A fuel cell system may include a cathode loop and a mechanical check valve. The check valve may be configured to close when a pressure within the loop is greater than a predetermined threshold and to open when the pressure is less than the threshold. The check valve may be disposed within the loop such that water within the loop and in a vicinity of the check valve drains from the loop if the check valve is open.

A vehicle may include a fuel cell system configured to provide motive power for the vehicle. The fuel cell system may include a cathode loop being arranged such that a portion of the loop forms a water pooling location where water normally pools during stack operation or after stack shut-down, and a normally open mechanical check valve disposed within a vicinity of the water pooling location.

A vehicle may include a fuel cell system configured to provide motive power for the vehicle. The fuel cell system may include a cathode loop having an operating pressure during fuel cell system operation. The cathode loop may include a normally open mechanical check valve disposed at a water pooling location within the loop and having a cracking pressure approximately equal to the operating pressure.

Like numbered elements of the Figures may have similar, although not necessarily identical, descriptions. As an example, elements 24, 124 may share similar descriptions.

DETAILED DESCRIPTION

Figure 1:
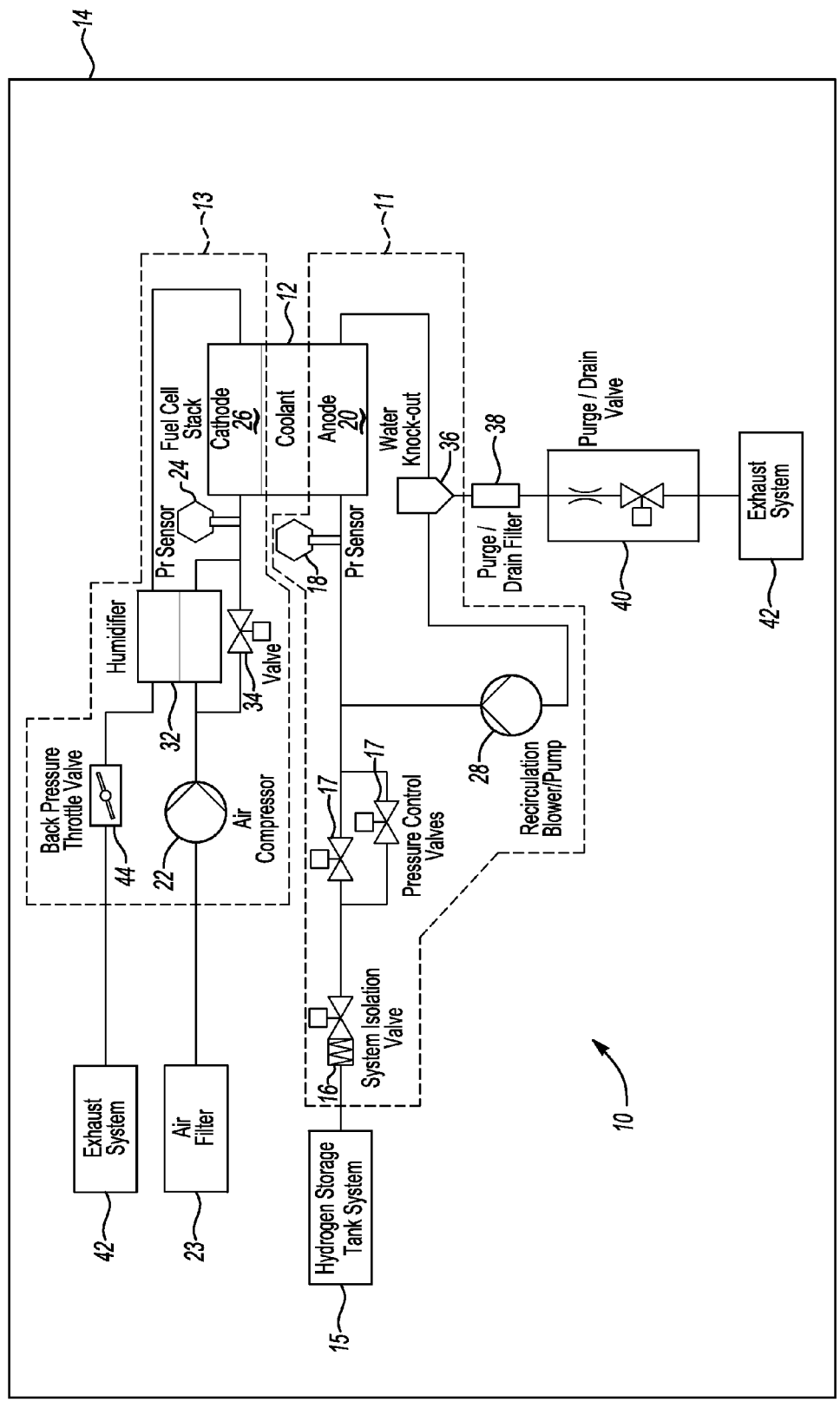
FIG. 1 is a schematic diagram of an example fuel cell system for an automotive vehicle.

Referring to FIG. 1, in an example PEM based fuel cell system 10, an anode subsystem 11 may provide the necessary hydrogen fuel at correct pressure, flow and humidity to a fuel cell stack 12. Likewise, a cathode subsystem (loop) 13 may provide the necessary oxygen (air) at correct pressure, flow and humidity to the stack 12.

As known in the art, electrical energy may be generated by the fuel cell stack 12 as the hydrogen and oxygen react. This electrical energy may be used to power various electrical devices and/or stored within an energy storage unit (not shown).

The fuel cell stack 12 of FIG. 1, for example, is configured to provide motive power for a vehicle 14. That is, the stack 12 is electrically connected in a known fashion with an electric machine (not shown) that converts electrical energy generated by the stack 12 to mechanical energy used to move the vehicle 14. Alternatively, the stack 12 may be electrically connected with a battery (not shown) to store electrical energy generated by the stack 12. An electric machine, in this alternative arrangement, may be configured in a known fashion to draw electrical energy from the battery to produce mechanical energy used to move the vehicle 14. Other arrangements are, of course, also possible.

Fuel supply from a hydrogen storage tank system 15 is enabled through a system isolation valve 16. The supply pressure to the fuel cell stack 12 is regulated by a pressure control device 17. The pressure control device 17 takes input from a pressure sensor 18 at the inlet of the fuel cell stack's anode 20 to regulate the hydrogen fuel pressure to the stack 12.

An air compressor 22 increases the ambient pressure of air filtered by air filter 23 based on input from an air pressure sensor 24 at the inlet of the fuel cell stack's cathode 26.

Controls are established in such a way that the pressure on either side of the fuel cell membrane (not shown) is maintained within a certain tolerance, for example around 600 mbar. The tolerance may vary depending upon the fuel cell stack design. Any overpressure or under pressure may result in system shut down to protect the fuel cell stack membrane from malfunction.

For effective power generation, the PEM type fuel cell stack 12 may require humidified gases. Anode gas humidity may be maintained by re-circulating the anode gas mixture from the fuel cell stack's outlet using a blower 28 to mix feed gas from the hydrogen storage tank system 15 with the recirculated hydrogen. Cathode gas (air) humidity is maintained by passing air through a humidifier 32. The humidifier 32 may be by-passed via valve 34.

At the anode side of the fuel cell stack's outlet, a water knock-out 36, purge/drain filter 38, and purge/drain valve 40 are provided to remove water from the anode outlet. This removed water is passed to an exhaust system 42 of the vehicle 14. At the cathode side of the fuel cell stack's outlet, a back pressure throttle valve 44 fluidly connects the humidifier 32 and the exhaust system 42.

The humidified gases along with the generated water (which is a by product of the chemical process during power generation), may present issues during fuel cell system start at or below freezing temperatures. The water from the humidified gases, for example, may condense and pool in low spots (due to gravity) within the cathode subsystem 13 during normal operation and/or during soak—the period between system shutdown and restart. These pools may freeze if ambient temperatures are at or below freezing.

Figure 2:
FIG. 2 is a schematic diagram of a portion of the fuel cell system of FIG. 1.
Figure 3:
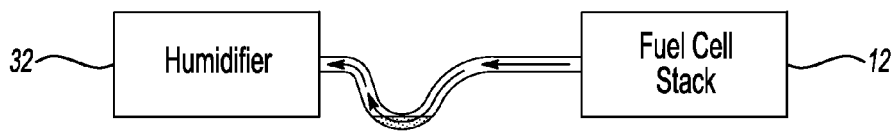
FIG. 3 is a schematic diagram of another portion of the fuel cell system of FIG. 1.
Figure 4:
FIG. 4 is a schematic diagram of yet another portion of the fuel cell system of FIG. 1.

Referring to FIGS. 2 and 3, water has condensed and pooled, for example, in low spots of the inlet and outlet tubing fluidly connecting the fuel cell stack 12 and humidifier 32. Referring to FIG. 4, water has condensed and pooled in a low spot of the tubing fluidly connecting the humidifier 32 and back pressure throttle valve 44. These low spots result from the manner in which the tubing connecting these components is routed within the vehicle 14 (FIG. 1). Of course, low spots may occur elsewhere depending on fuel cell system design and layout, vehicle inclination, etc. As an example, the humidifier 32 may be a low spot if it is positioned lower than other components of the cathode subsystem 13 (FIG. 1) in the vicinity. As another example, a reservoir (not shown) that is associated with (or is a part of) the cathode subsystem 13 may be a low spot if it is positioned lower than other components of the cathode subsystem 13 in the vicinity.

Figure 5:
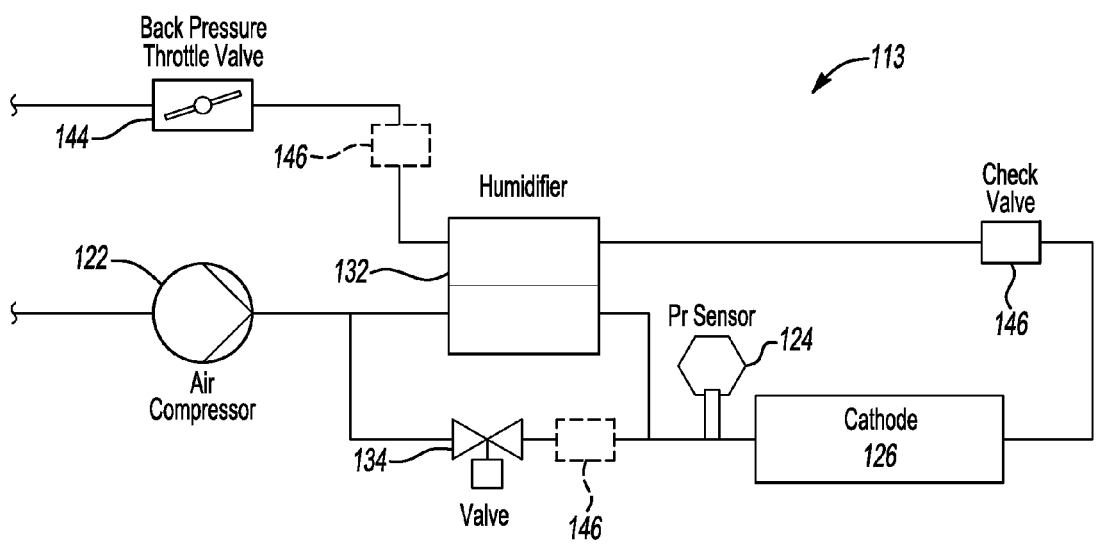
FIG. 5 is a schematic diagram of an embodiment of a cathode subsystem.

Referring to FIG. 5, a mechanical check valve 146 is disposed within a low spot of the tubing fluidly connecting the outlet of the fuel cell stack's cathode 126 and the humidifier 132. As known in the art, a mechanical check valve (e.g., non-return valve, one-way valve, etc.) normally allows fluid to flow through it in only one direction. The check valve 146 is configured, in a known fashion, to be normally open. That is, when there is no pressure or pressures below the cracking pressure within the cathode subsystem 113, the check valve 146 is open to allow water pooled in its vicinity to exit the cathode subsystem 113. When the cathode subsystem 113 is pressurized for operation, the check valve 146 is closed so as to prevent air from escaping the cathode subsystem 113. That is, the cracking pressure for the check valve 146 may be set at, for example, a pressure that is less than or equal to the pressure within the cathode subsystem 113 during operation. The cracking pressure may also account for any head resulting from water pooled above the check valve 146.

In the embodiment of FIG. 5, the check valve 146 is positioned within a bottom portion of the tubing (as opposed to the top portion for example) so as to permit maximum water drain via gravity. The check valve 146, however, may be positioned in any suitable location within the tubing, etc.

In other embodiments, one or more mechanical check valves 146 may be disposed, for example, in the tubing fluidly connecting the humidifier 132 and inlet of the fuel cell stack's cathode 126 (as indicated by phantom line), in the tubing fluidly connecting the humidifier 132 and back pressure throttle valve 144 (as indicated by phantom line), within the fuel cell stack's cathode 126, within the humidifier 132, etc. depending on where low spots occur in the cathode subsystem 113. Such low spots may be identified via testing, simulation, etc. Low spots may also located by design.

Any suitable/known check valve type may be used. For example, a ball check valve, diaphragm check valve, swing check valve, clapper valve, stop-check valve, lift-check valve, etc. may be used.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A vehicle comprising:
a fuel cell system configured to provide motive power for the vehicle and including a cathode loop (i) being arranged such that a portion of the loop forms a water pooling location where water normally pools during stack operation or after stack shut-down and (ii) including a normally open mechanical check valve disposed within a vicinity of the water pooling location.

2. The vehicle of claim 1 wherein the cathode loop further includes a fuel cell stack, humidifier, and a tube fluidly connecting the stack and humidifier.

3. The vehicle of claim 1 wherein the cathode loop further includes a control valve, humidifier, and a tube fluidly connecting the control valve and humidifier.

4. The vehicle of claim 1 wherein the mechanical check valve is a ball check valve, a diaphragm check valve, a swing check valve, a clapper valve, a stop-check valve, or a lift-check valve.

5. A fuel cell system comprising:
a cathode loop including a fuel stack, a humidifier, a first tube fluidly connecting the stack and humidifier, a control valve, and a second tube fluidly connecting the control valve and humidifier; and
a mechanical check valve (i) configured to close when a pressure within the loop is greater than a predetermined threshold and to open when the pressure is less than the threshold and (ii) disposed within the loop such that water within the loop and in a vicinity of the check valve drains from the loop if the check valve is open.

6. The system of claim 5 wherein the mechanical check valve is further disposed in a location within the loop where water normally pools during stack operation or after stack shut-down.

7. The system of claim 5 wherein the mechanical check valve is further disposed within a bottom portion of the first or second tubes.

8. The system of claim 5 wherein the mechanical check valve is a ball check valve, a diaphragm check valve, a swing check valve, a clapper valve, a stop-check valve, or a lift-check valve.

9. The system of claim 5 wherein the first tube is an inlet air tube to the fuel cell stack.

10. The system of claim 5 wherein the first tube is an outlet air tube from the fuel cell stack.

11. A vehicle comprising:
a fuel cell system configured to provide motive power for the vehicle and including a cathode loop having an operating pressure during fuel cell system operation, the cathode loop including a normally open mechanical check valve (i) disposed at a water pooling location within the loop and (ii) having a cracking pressure approximately equal to the operating pressure.

12. The vehicle of claim 11 wherein the cathode loop further includes a fuel cell stack, humidifier, and a tube fluidly connecting the stack and humidifier.

13. The vehicle of claim 11 wherein the cathode loop further includes a control valve, humidifier, and a tube fluidly connecting the control valve and humidifier.

14. The vehicle of claim 11 wherein the mechanical check valve is a ball check valve, a diaphragm check valve, a swing check valve, a clapper valve, a stop-check valve, or a lift-check valve.

* * * * *